(12) United States Patent
Lango et al.

(10) Patent No.: US 9,733,867 B2
(45) Date of Patent: Aug. 15, 2017

(54) MULTI-LAYERED STORAGE ADMINISTRATION FOR FLEXIBLE PLACEMENT OF DATA

(71) Applicant: BRACKET COMPUTING, INC., Sunnyvale, CA (US)

(72) Inventors: Jason A. Lango, Sunnyvale, CA (US); John K. Edwards, Sunnyvale, CA (US); Nitin Muppalaneni, Los Altos, CA (US)

(73) Assignee: Bracket Computing, Inc., Mountain View, CA (US)

( * ) Notice: Subject to any disclaimer, the term of this patent is extended or adjusted under 35 U.S.C. 154(b) by 471 days.

(21) Appl. No.: 14/206,123

(22) Filed: Mar. 12, 2014

(65) Prior Publication Data

US 2014/0281350 A1    Sep. 18, 2014

Related U.S. Application Data

(60) Provisional application No. 61/799,550, filed on Mar. 15, 2013.

(51) Int. Cl.
*G06F 3/06* (2006.01)

(52) U.S. Cl.
CPC .......... *G06F 3/0665* (2013.01); *G06F 3/0604* (2013.01); *G06F 3/067* (2013.01);
(Continued)

(58) Field of Classification Search
CPC .... G06F 3/0665; G06F 3/0604; G06F 3/0631; G06F 3/0667; G06F 3/067
See application file for complete search history.

(56) References Cited

U.S. PATENT DOCUMENTS 7,647,329 B1 * 1/2010 Fischman ......... G06F 17/30094
   707/999.1
8,443,153 B1   5/2013 Edwards
   (Continued)

FOREIGN PATENT DOCUMENTS

JP      2016512906      5/2016

OTHER PUBLICATIONS

European Patent Office, "Search Report" in application No. PCT/US2014/023816, dated Jul. 11, 2014, 8 pages.
European Patent Office, "Search Report" in application No. PCT/US2014/023814, dated Jul. 24, 2014, 13 pages.
Current Claims in application No. PCT/US2014/023814, dated Jun. 2014, 7 pages.
(Continued)

*Primary Examiner* — Eric S Cardwell
(74) *Attorney, Agent, or Firm* — Hickman Palermo Becker Bingham LLP

(57) ABSTRACT

A storage administrator may maintain location information in separate layers. A data storage system may identify the location of particular data by identifying the virtual location of data, such as the logical extent to which the data belongs. Object stores may maintain mappings of virtual locations to physical locations, such as mappings of extent identifiers to virtual storage objects and mappings of virtual storage objects to storage unit locations. When particular data is relocated to a new location, a storage administrator may update mappings used to translate virtual locations to physical locations, such as an extent-object mapping or an object-storage unit mapping. References to the virtual locations, such as references to logical extent identifiers, may not be updated in response to the relocation of data.

46 Claims, 7 Drawing Sheets

(52) U.S. Cl.
 CPC ......... *G06F 3/0631* (2013.01); *G06F 3/0667* (2013.01); *G06F 3/0671* (2013.01)

(56) References Cited

U.S. PATENT DOCUMENTS

| | | | |
|---|---|---|---|
| 2001/0011326 | A1 | 8/2001 | Yoshikawa et al. |
| 2004/0243699 | A1 | 12/2004 | Koclanes et al. |
| 2005/0004929 | A1 | 1/2005 | Stephenson |
| 2006/0015678 | A1 | 1/2006 | Wang et al. |
| 2007/0067435 | A1 | 3/2007 | Landis et al. |
| 2008/0120350 | A1 | 5/2008 | Grabowski et al. |
| 2009/0228669 | A1 | 9/2009 | Slesarev et al. |
| 2010/0058347 | A1 | 3/2010 | Smith et al. |
| 2011/0125894 | A1 | 5/2011 | Anderson et al. |
| 2011/0264805 | A1 | 10/2011 | Breigand et al. |
| 2012/0032965 | A1 | 2/2012 | Patel et al. |
| 2012/0042115 | A1 | 2/2012 | Young |
| 2012/0054763 | A1 | 3/2012 | Srinivasan |
| 2013/0054932 | A1* | 2/2013 | Acharya ............ G06F 3/0605 711/202 |
| 2013/0060839 | A1 | 3/2013 | Van Biljon |
| 2013/0238791 | A1 | 9/2013 | Anderson |
| 2014/0068703 | A1 | 3/2014 | Balus et al. |
| 2014/0089500 | A1 | 3/2014 | Sankar et al. |
| 2014/0095691 | A1 | 4/2014 | Ganguli et al. |
| 2014/0122818 | A1 | 5/2014 | Hayasaka |
| 2014/0281308 | A1 | 9/2014 | Lango |
| 2014/0282824 | A1 | 9/2014 | Lango |

OTHER PUBLICATIONS

Claims in European Application No. PCT/2014/023816, dated Jul. 2014, 9 pages.
U.S. Appl. No. 13/837,456, filed Mar. 15, 2013, Office Action, Jan. 21, 2015.
U.S. Appl. No. 13/837,375, filed Mar. 15, 2013, Office Action, Feb. 19, 2015.
U.S. Appl. No. 13/837,456, filed Mar. 15, 2013, Final Office Action, Jun. 23, 2015.
U.S. Appl. No. 13/837,375, filed Mar. 15, 2013, Office Action, Sep. 3, 2015.
U.S. Appl. No. 13/837,456, filed Mar. 15, 2013, Notice of Allowance, Nov. 5, 2015.
U.S. Appl. No. 13/8.7,375, filed Mar. 15, 2013, Interview Summary, Nov. 25, 2015.
U.S. Appl. No. 13/837,375, filed Mar. 15, 2013, Notice of Allowance, Jan. 11, 2016.
European Patent Office, "Written Opinion" in application No. 14725261.3-1959, dated Jan. 20, 2016, 2 pages.
Claims in application No. 14725261.3-1959, Dated Jan. 2016, 1 page.
European Patent Office, "Search Report" in application No. 14 724 820.7-1957, dated Jan. 1, 2017, 7 pages.
European Claims in application No. 14 724 820.7-1957, dated Jan. 2017, 5 pages.

\* cited by examiner

MULTI-LAYERED STORAGE ADMINISTRATION FOR FLEXIBLE PLACEMENT OF DATA

CROSS-REFERENCE TO RELATED APPLICATIONS; BENEFIT CLAIM

This application claims benefit under 35 U.S.C. 119 of provisional application 61/799,550, filed Mar. 15, 2013, the entire contents of which is hereby incorporated by reference for all purposes as if fully set forth herein. This application is related to application Ser. No. 13/837,375, filed Mar. 15, 2013, and application Ser. No. 13/837,456, filed Mar. 15, 2013, the entire contents of which are hereby incorporated by reference in their entirety for all purposes as if fully set forth herein.

TECHNICAL FIELD

The present disclosure generally relates to techniques for managing data stored in virtual storage objects that comprise portions of different storage units.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In data processing, data storage systems may manage access to user or application data stored as blocks of data on data storage devices. Data storage systems maintain location metadata identifying the location of user or application data for various purposes, such as for retrieving, storing, or updating the user or application data, properly associating other non-location metadata with the user or application data, cloning the user or application data, and as a part of system snapshots that captures the state of the user or application data at particular times. Traditional data storage systems may identify the location of user or application data or other non-location metadata by storing pointers to the physical block address of the user or application data or other non-location metadata.

In some data storage systems, data or metadata may frequently be re-located to new locations, such as to different storage units. For example, a storage administrator that administrates the storage of user or application data in a virtual data center may need to relocate certain data or metadata stored on one storage unit to a different storage unit of the virtual data center for many possible reasons, relating to but not limited to service level management of performance, data availability, system maintenance, error recovery, failure recovery, cost optimization, load balancing, and capacity management. Furthermore, a storage controller that administrates data and metadata stored in cloud computing and virtual data center environments may be able to obtain further storage units with ease and, thus, may move data and metadata even more frequently in such environments. In order to properly serve their function, data storage system records need to reflect the up-to-date location of data. Maintaining accurate data location records can be a cumbersome task in systems where data locations change frequently. New techniques for alleviating the burden of data location changes on data storage systems are needed.

SUMMARY OF THE INVENTION

The appended claims may serve as a summary of the invention.

DESCRIPTION OF EXAMPLE EMBODIMENTS

Figure 1:
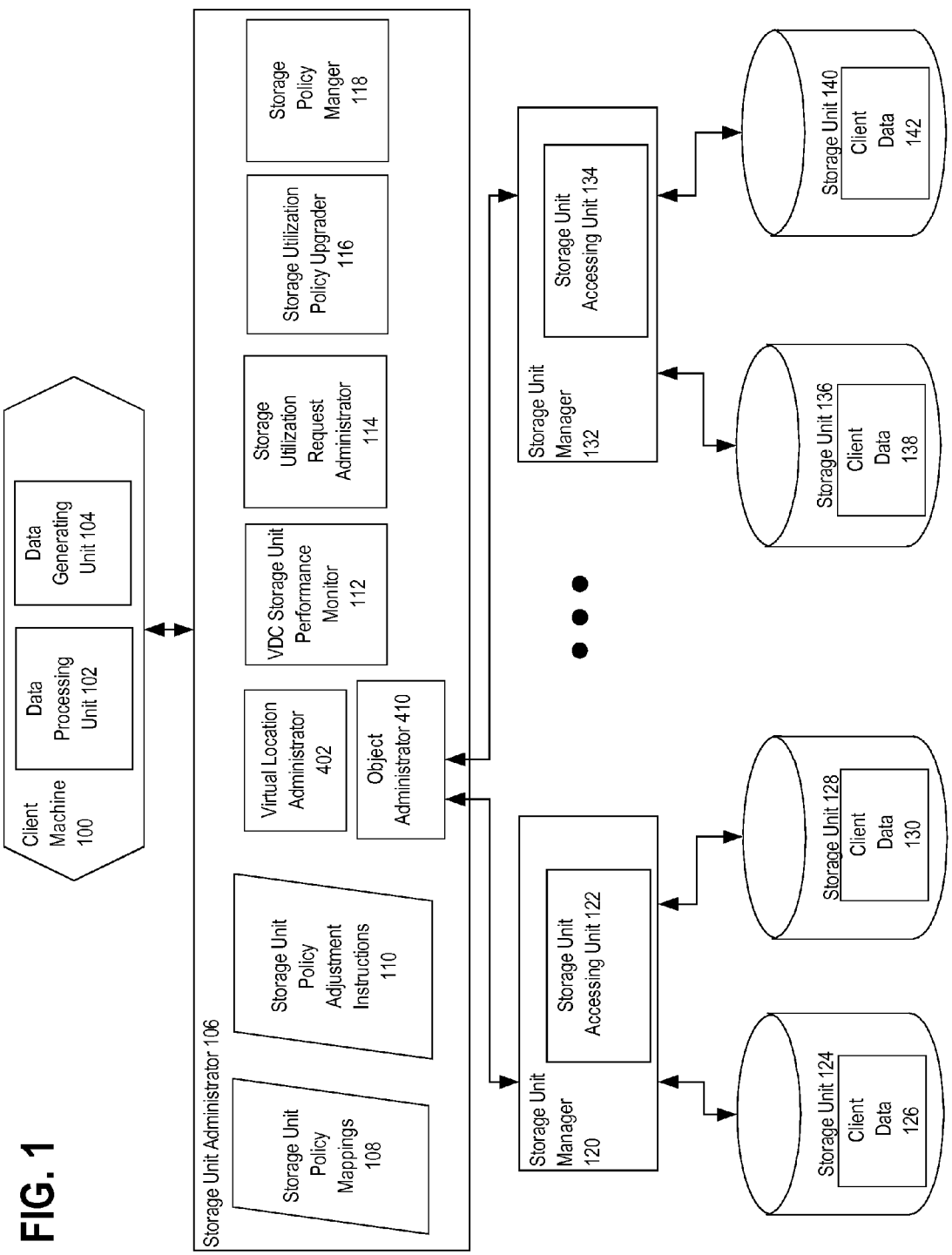
FIG. 1 illustrates an example networked computer system arrangement that may be used to implement an embodiment.

Multi-layered storage administration for flexible placement of data is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
  2.0 Structural and Functional Overview
    2.1 Usage of Extent-Object Mappings and Object Portion Directories During Retrieval of Client Data
    2.2 Updating of Extent-Object Mappings or Object Portion Directories Upon Relocation of Client Data
  3.0 Implementation Mechanisms—Hardware Overview
  4.0 Extensions and Alternatives

1.0 GENERAL OVERVIEW

Embodiments provide, in general, innovative data storage processes applicable to virtualized data storage systems that are capable of storing and managing references to stored data based upon virtual locations at which the data is stored without identifying physical locations in which the data is stored.

In one aspect, an embodiment provides a method comprising receiving, using a computer, a request to store data; causing storage of the data in a data storage system of a virtualized computer system; storing a data location record that identifies one or more virtual locations at which the data is stored without identifying any physical locations in which the data is stored. In one feature, the method includes sending, to an object administrator, an instruction to store the data; in response to sending the instruction, receiving one or more virtual location identifiers identifying virtual locations in which the data is stored without identifying any physical locations in which the data is stored.

In another embodiment, a method comprises receiving, at a data storage system, a request for data; identifying, a virtual location at which the data is stored; determining, based on the virtual location at which the data is stored and one or more mappings of virtual locations to object administrators, an object administrator associated with physical storage of the data; determining, at the object administrator, based on one or more mappings, one or more physical locations in a data storage system of a virtualized computer system that correspond to the virtual location; retrieving data from the one or more physical locations of the data storage system of the virtualized computer system. In one feature, the method involves receiving, at an object administrator, a request for data identifying at least a logical extent at which the data is stored; determining, one or more objects that belong to the logical extent identified in the request; determining, for each object of the one or more objects, one or more storage unit portions that belong to the object; retrieving the data from the one or more storage unit portions that correspond to each object of the one or more objects.

In another embodiment, a method comprises determining, at a storage administrator, that a condition has occurred requiring transformation of particular data or movement of particular data to one or more new physical locations in a data storage system of a virtualized computer system, wherein the particular data is stored at a particular virtual location; in response to the determination: storing data corresponding to the particular data at the one or more new physical locations; and updating a mapping corresponding to the particular virtual location to indicate that the particular virtual location corresponds to the one or more new physical locations instead of one or more prior physical locations without updating any references to the particular virtual location.

In a data storage system, a system controller may manage access to user or application data stored in a plurality of storage unit. The data storage system may be a part of another computer system (such as a local file system), a standalone storage system implemented on a single computer system, or a distributed storage system implemented on a network of computer systems. The data storage system administrator may store data location records identifying user or application data locations. The data location records may identify the locations by identifying the logical extents to which the corresponding data belongs, without identifying the physical block addresses at which the data is stored. An object administrator may separately maintain mappings of extents to virtual storage objects, and for each virtual storage object, a directory of the particular storage unit portions that collectively make up the virtual storage object. In such a system, the burden of updating data storage system records may be minimal even if user or application data is moved to a different virtual storage object or if one or more of storage units belonging to the virtual storage object containing the user or application data is replaced, removed, or added. The data storage system administrator may not need to update any records because the extent which contains the moved data would not change. The object administrator may simply update the mappings of extents to virtual storage objects if the extent is moved to a different virtual storage object. If a particular storage unit portion belonging to the virtual storage object is removed, replaced, or added, the object store may update the virtual storage object directory to indicate that the particular storage unit portion(s) have been removed, replaced, or added.

In some embodiments, when data is transformed, a storage unit administrator instantiates new virtual storage objects and/or storage unit portions for storing the transformed data. For example, stored data may need to be modified in accordance with a change in an encryption or compression algorithm. In such a case, an object administrator may write the transformed data to a new virtual object and update the mappings of extents to virtual storage objects to indicate that new virtual storage object belongs to a certain logical extent. In another embodiment, the object administrator may write the transformed data to a new storage unit portion and may update the mappings of virtual storage objects to storage unit portion(s) to indicate that the new storage unit portion belongs to a certain virtual storage object.

Transformations may be concurrently applied to different virtual storage objects of the same logical extent or different storage unit portions of the same virtual storage object. In some embodiments, transformations may be concurrently applied to different virtual storage objects of the same logical extent or different storage unit portions of the same virtual storage object in a single I/O (input/output) operation. Additionally, different types of transformations may be applied to the different virtual storage objects or the different storage unit portions. That is, data in a first storage unit may be compressed and data in a second storage unit may be encrypted in the same I/O operation. In another embodiment, the same data may be both compressed and encrypted in the same I/O operation.

In an embodiment, the data maintained by the data storage system, which may include data storage system snapshots and associations of metadata with particular locations, need not be modified because the locations are identified using extent identifiers, which do not change even as the data is relocated to a different object store or storage unit. Thus, updates to user or application data location information may require relatively simple updates to the relevant mappings and may be handled by an object administrator, thereby freeing the data storage system from frequent and burdensome updates.

The virtual location administrator and object administrator may be components of a storage unit administrator, which manages a plurality of different storage units on behalf of a client device. As described in further detail in application Ser. Nos. 13/837,375 and 13/837,456, which are hereby incorporated by reference in their entirety as if fully set forth herein, the storage unit administrator may move data for a plurality of reasons, including in response to determining that the performance of one or more storage units is inadequate or in response to receiving a request from the client for higher performance for some or all client data.

In an embodiment, a storage unit administrator determines that a condition requiring movement of particular data to a new location has occurred, where the particular data belongs to a particular logical extent stored at a particular virtual storage object. In response to the determination, the storage unit administrator causes the particular data to be stored at the new location. Further in response to the determination, the storage unit administrator updates one or more extent-object mapping(s), which prior to the updating indicated that the particular virtual storage object stores information belonging to the particular logical extent, to indicate that a different virtual storage object stores information belonging to the particular logical extent or object-storage unit mapping(s), which prior to the updating indicated that a particular set of storage unit portions belong to the particular virtual storage object, to instead indicate that a different set of storage unit portions belong to the particular virtual storage object.

The storage unit administrator cause the physical location(s) of the particular data to change without modifying data location references stored at a file system administrator layer, which identify the virtual locations of the particular data.

2.0 STRUCTURAL AND FUNCTIONAL OVERVIEW

FIG. 1 illustrates an example networked computer system arrangement that may be used to implement an embodiment. For purposes of illustrating clear examples, FIG. 1, FIG. 2, FIG. 3, FIG. 4 show a representative number of various functional elements that may be used in an embodiment; however, other embodiments may use any number of such functional elements and therefore FIG. 1, FIG. 2, FIG. 3, FIG. 4 are intended as merely possible implementation examples.

Client machine 100 comprises data processing unit 102, which may process data retrieved from storage units remote to the client machine, and data generating unit 104, which may generate data that is sent to storage units remote to the client machine.

Client machine 100 may be communicatively coupled to storage unit administrator 106. Storage unit administrator 106 may be communicatively coupled to one or more storage unit managers, which may each be communicatively coupled to one or more storage units. Such a system may be utilized when client machine 100 sends storage unit utilization requests, such as request to store data at, or retrieve data from, storage units at virtual data centers.

Storage unit administrator 106 represents one or more computers, programs, processes, or other logical elements that are configured for managing requests to utilize storage units 124, 128, 136, 140. Storage units 124, 128, 136, 140 may be virtualized storage units hosted by one or more cloud service providers, database storage units, computing storage units provided by a CSP (cloud service provider), or other storage units. Storage units 124, 128, 136, 140 may each be located at different physical host machines. Storage units 124, 128, 136, 140 may be any of a variety of different storage units including objects, blocks, or extents.

Storage unit administrator 106 comprises storage unit utilization policy mappings 108, storage unit utilization policy adjustment instructions 110, storage unit performance monitor 112, storage policy manager 118, storage unit utilization request administrator 114, and storage unit utilization policy upgrader 116. Storage unit utilization policy mappings 108 may identify associations between storage unit utilization policies and service levels.

Storage unit utilization policy adjustment instructions 110 may comprise instructions for modifying storage unit utilization policy mappings 108. Storage unit utilization request administrator 114 may direct incoming data operation requests to the appropriate storage unit managers or storage units. Storage unit performance monitor 112 may monitor the performance of one or more storage units. Storage unit utilization policy upgrader 116 may update storage unit utilization policy mappings 108 according to storage unit utilization policy adjustment instructions 110 and based on an analysis of storage unit performance. Storage policy manager 118 may cause the data of client machine 100 to be stored according to a new storage policy based on determined performance information.

Storage unit administrator 106 may be communicatively coupled to one or storage unit managers, such as storage unit managers 120 and 132. Each of storage unit managers 120, 132 may be communicatively coupled to one or more storage units, such as storage units 124, 128, 136, 140. In an embodiment, storage unit administrator 106 communicates directly with storage units 124, 128, 136, 140, rather than communicating through a storage unit manager.

In some embodiments, storage unit managers 120 and 132 comprise storage unit accessing units. Storage unit accessing unit 122 may send information to, or receive information from, storage units 124, 128, which are both communicatively coupled to storage unit manager 120. Similarly, storage unit accessing unit 134 may send information to, or receive information from, storage units 136, 140, which are both communicatively coupled to storage unit manager 132.

Storage units 124, 128, 136, 140 may comprise data associated with client machine 100, such as client data 126, 130, 138, 142. Client machine 100 may read data from, or write data to, storage units 124, 128, 136, 140 by sending the read or write request to storage unit administrator 106. Data storage units 124, 128, 136, 140 may be block storage units, file storage units, object storage units, database storage units, or other storage units, according to various embodiments.

Figure 2:
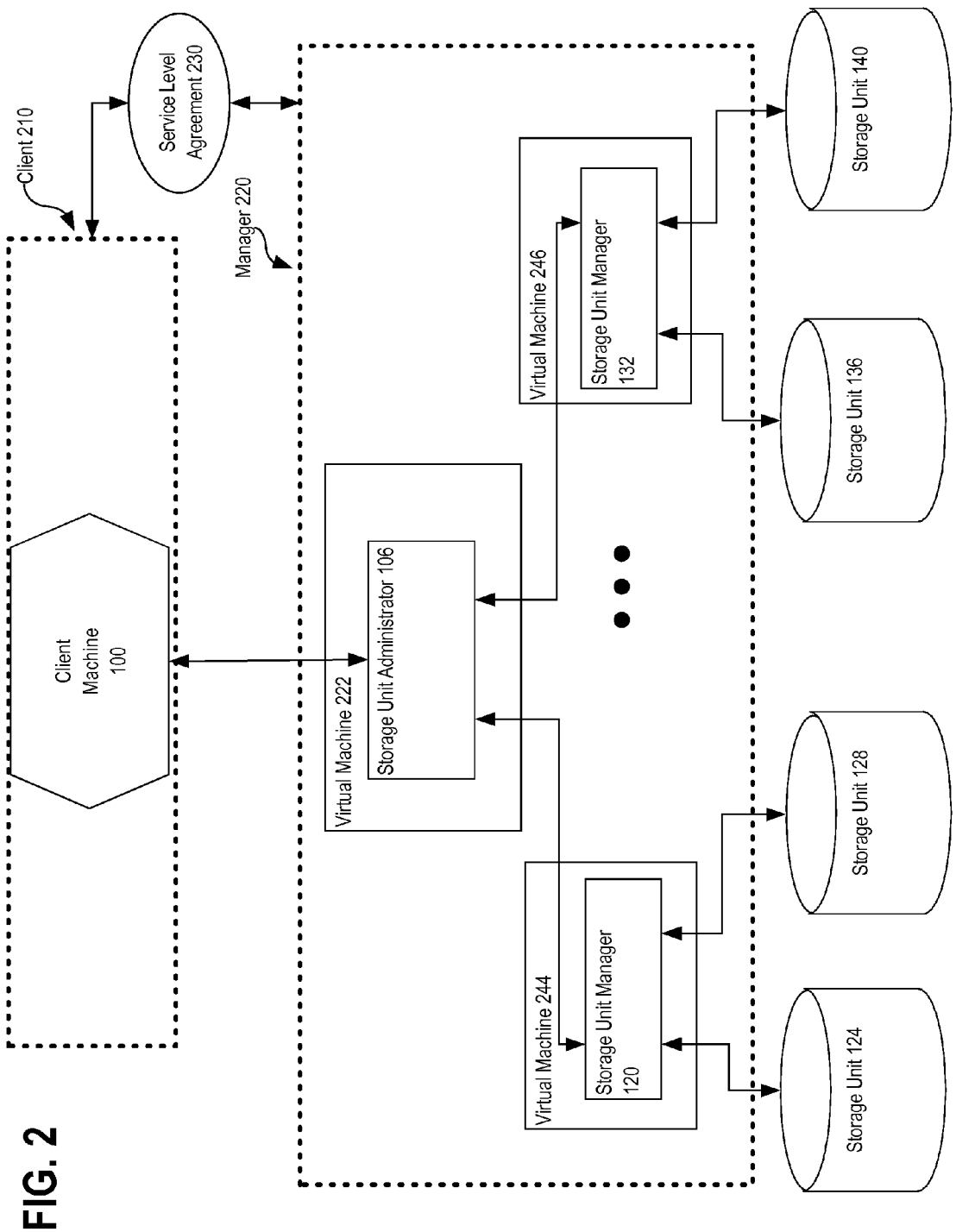
FIG. 2 illustrates an example context of the system of FIG. 1.

FIG. 2 illustrates an example context of the system of FIG. 1. Client machine 100 may be controlled by client 210 and the logic of storage unit administrator 106 and storage unit managers 120 and 132 may be controlled by manager 220.

Manager 220 may be different from the cloud service provider(s) that hosts storage units 124, 128, 136, 140 and different from client 210, which may utilize data stored in, or computed at, storage units 124, 128, 136, 140. Manager 220 may control and manage storage units 124, 128, 136, 140 on behalf of client 210, according to the methods described herein.

Storage unit administrator 106 may operate within virtual machine 222, storage unit manager 120 may operate within a separate virtual machine 224, and storage unit manager 132 may operate within a separate virtual machine 226. In an embodiment, virtual machine 222, 224, and 226 are hosted by the same cloud service provider that hosts one or more of storage units 124, 128, 136, 140. Manager 220 may control the execution of processes within virtual machines 222, 224, 226, such as the logic of storage unit administrator 106, storage unit manager 120, and storage unit manager 132.

In some embodiments, storage unit administrator 106 accesses storage units 124, 128, 136, 140 directly, without requesting storage unit manager 120 or 132 to access storage units 124, 128, 136, 140. However, in some embodiments, one or more cloud service providers, which host storage units 124, 128, 136, 140, restrict the number of storage units that may be connected to a single virtual machine to be less than a particular number. For example, some cloud service providers limit the number of virtual disks that may be accessed by a particular virtual machine. In such an embodiment, a system as illustrated in FIGS. 1 and 2 may allow storage unit administrator 106 to maximize the number of storage units that can be controlled by the storage unit administrator. Storage unit administrator 106 may manage storage units 124, 128, 136, 140 by requesting modules of a plurality of different virtual machines, such as storage unit managers 120 and 132 at virtual machines 224 and 226, to perform various storage unit utilization operations or provide necessary performance information. Such an approach may allow storage unit administrator 106 to manage a number of storage units that is greater than the maximum number of storage units permitted for utilization by a single virtual machine.

Service level agreement 230 may be an agreement between client 210 and manager 220 that indicates a particular storage service level to be provided to client 210. The service level agreement may indicate a threshold value or range of values that indicate acceptable levels of performance for performing storage unit utilization requests. The storage unit utilization requests may include requests to access data from, or save data to, storage units 124, 128, 136, 140. For example, the service level agreement may indicate that data operation requests received from client machine 110 at storage unit administrator 106 are to be completed at a median speed of 100 data operations per second and no slower than 50 milliseconds for an individual data operation. Service level agreement 230 may only be between client 210 and manager 220, and may not include any cloud service provider.

Figure 3:
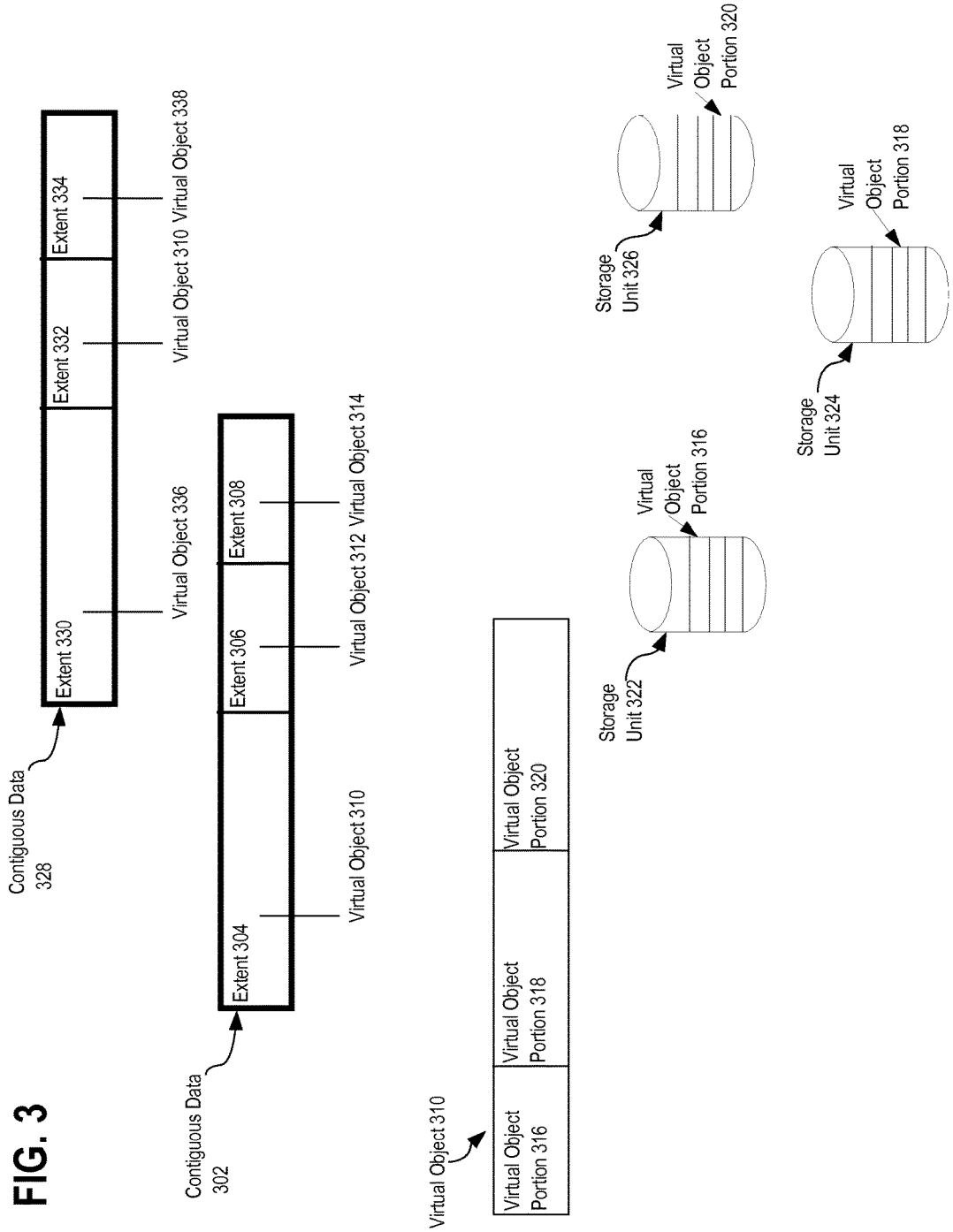
FIG. 3 illustrates an example distribution of user or application data in virtual storage objects and storage unit portions.

FIG. 3 illustrates an example distribution of user or application data in virtual storage objects and storage unit portions in a data storage system, such as a file system. In alternate embodiments, the data storage system may be used to store logical volumes or objects, rather than files, and may thus be identified as a logical volume manager, block storage system, object store, or any other logical data management service. In other embodiments, data storage system is used to store user or application data in databases.

Contiguous data 302 may be a set of contiguous data, such as a file, logical volume, or object and may be partitioned into logical extents, which may be contiguous portions of the data. For example, contiguous data 302 may be partitioned into extent 304, 306, and 308 and contiguous data 328 may be partitioned into extent 330, 332, and 334. In some embodiments, the extents each have a fixed size. Storage unit administrator 106 may store each extent at a different virtual storage object. For example, extents 304, 306, 308 may respectively be stored at virtual storage objects 310, 312 (not pictured), 314 (not pictured).

Extents of different contiguous data may be aggregated to form a single object. For example, extent 304 of contiguous data 302 and extent 332 of contiguous data 328 may be aggregated to form virtual object 310. In an embodiment, contiguous data 302 and 328 are different files.

In this context, a virtual storage object is a collection of storage unit portions, where some or all of the storage unit portions may be portions of different storage units. For example, virtual storage object 310 may collectively represent virtual object portions 316, 318 320 and each object portion may be a portion of a separate storage unit. Virtual object portion 316 may be a portion of storage unit 330, virtual object portion 318 may be a portion of storage unit 332, and virtual object portion 320 may be a portion of storage unit 334. In some embodiments, each virtual object portion is of a fixed-size.

Storage unit administrator 106 may partition the user or application data across the storage units according to a particular storage policy. The storage policy may indicate a level of data redundancy, mirroring or replication, data storage striping policy (bit level, byte level, and block level), particular RAID level, an alternative to RAID such as a particular erasure coding scheme, or any other parameter relating to the reliability, availability, performance or capacity of a storage unit. The number of storage units across which the data is distributed, the amount of data stored in each storage unit, which storage units should maintain redundant data, how the redundancy data is to be distributed across various storage units, and other such parameters may depend on the storage policy selected by storage unit administrator 106.

Figure 4:
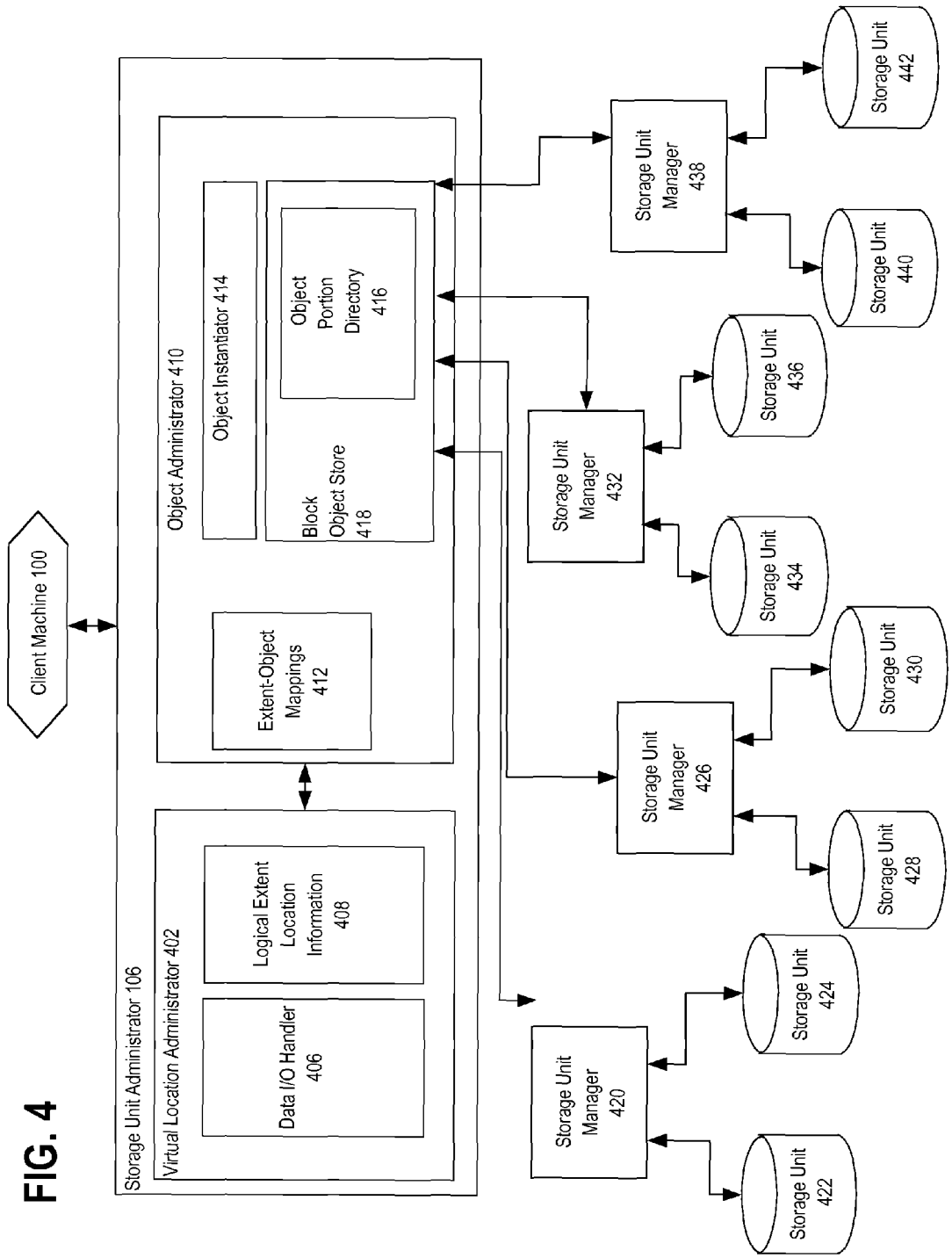
FIG. 4 illustrates the components of an example storage unit administrator in an example networked computer system.

FIG. 4 illustrates the components of an example storage unit administrator in an example networked computer system. Storage unit administrator 106 may manage and facilitate access to client data stored at storage units 422, 424, 428, 430, 434, 436, 440, 442 via storage unit managers 420, 426, 432, 438. Storage unit administrator 106 may comprise virtual location administrator 402, which performs tasks such as maintaining user or application metadata and handling requests to retrieve or store client data at the storage units.

Data I/O handler 406 receives requests to read data from client machine 100 and provides the requested data to client machine 100. Logical extent location information 408 identifies location information for each logical extent. The location information may identify one or more virtual locations in which the data of the logical extent is stored without identifying any physical locations in which the data is stored. For example, the location information may include extent identifiers indicating the virtual locations of data. The particular physical locations that make up the logical extents may change over time without any updates to logical extent location information 408. In other embodiments, the virtual locations in which the data is stored may be identified using logical block identifiers, logical object identifiers, and/or as a byte-offset in a virtual disk, file, or object.

In an embodiment, logical extent location information 408 comprises a logical extent tree for each file, logical volume, or object, where each entry in the tree corresponds to particular data and includes an extent ID identifying the corresponding extent, an offset amount indicating the distance from the beginning of the extent until the data begins, and a length amount indicating the amount of data contained in the extent starting from the offset. Using logical extent information 408, virtual location administrator 402 may identify the extent ID(s) of any data which may be requested by a client. In some embodiments, the logical extent tree is has the structure of a B+ tree.

Storage unit administrator 106 comprises object administrator 410, which may determine the physical location of the requested data within a corresponding storage unit. Object administrator 410 may maintain extent-object mappings 412, which may identify a corresponding virtual storage object for each extent identified in logical extent information 408. In other embodiments, extent-object mappings 412 may be stored at virtual location administrator 402. Storage unit administrator 106 may update extent-object mappings 412 if data included in a particular extent is relocated to a different object. In some embodiments, an extent ID is a reference to one or more locations in extent-object mappings 412, which contain mapping information for the corresponding extent. The mapping information may identify one or more objects that make up the extent identified by the extent ID.

Object administrator 410 may comprise object instantiator 414, which may instantiate new virtual storage objects when necessary. For example, when data is moved to a new virtual storage object or a new storage object portion, object instantiator 414 may request the virtual data center for one or more new storage units. Object instantiator 414 may aggregate extents from different contiguous data into a larger object. For example, object instantiator may aggregate extent 304 from contiguous data 302 and extent 332 from contiguous data 328 to form virtual object 310.

Object administrator 410 may comprise object stores that facilitate the retrieval and storage of data in associated storage units. For example, block object store 418 may be capable of communicating with virtual storage objects that include portions of CSP block storage units provided by a cloud service provider (CSP), such as storage units 422, 424, 428, 430. Depending on the particular embodiment, block object store 418 may communicate with the storage units either via storage unit managers 420 and 426 or independent of the storage unit managers. In other embodiments, a single object store may be used to communicate with storage units of different device types.

Block object store 418 may respectively maintain object portion directory 416. Block object store 418 may comprise one or more rotational hard disk drives (HDDs), flash-based solid-state drives (SSDs), volatile or non-volatile random access memory (RAM or NVRAM), or some other type of media. For each virtual storage object managed by the object store, the object portion directory may identify the particular storage unit portions included in the virtual storage object and the location of the particular storage unit portions. For example, object portion directory 416 may indicate that virtual storage object 310 includes virtual object portion 316, which begins at location X of storage unit 322, virtual object portion 318, which begins at begins at location Y of storage unit 324, and virtual object portion 320, which begins at location Z of storage unit 326. The object portion directory may also indicate an ordering of the storage unit portions. For example, object portion directory 416 may indicate that virtual object portion 316 is followed by virtual object portion 318, which is followed by virtual object portion 320. Object administrator 410 may determine the storage unit addresses of the requested data based on the virtual location information received from virtual location administrator 402 in combination with mappings of virtual locations to physical location stored at object administrator 410. For example, object administrator 410 may receive an extent identifier, offset amount, and length amount and the storage unit addresses of the requested data may be determined by locating the object belonging to the identified extent using extent-object mappings 412 and the storage unit portions belonging to the identified objects using object portion directory 416. The storage unit addresses identify the locations of the data within the corresponding storage units.

Virtual location administrator 402 may only store data locations using virtual location identifiers. Virtual location identifiers may include one or more of logical extent identifiers, logical block identifiers, logical object identifiers. In another embodiment, a virtual location may be identifies as a byte-offset in a virtual disk, file, or object. Object administrator 410 may translate virtual location identifiers to physical locations based on extent-object mappings 412 and/or object portion directory 416.

Figure 5:
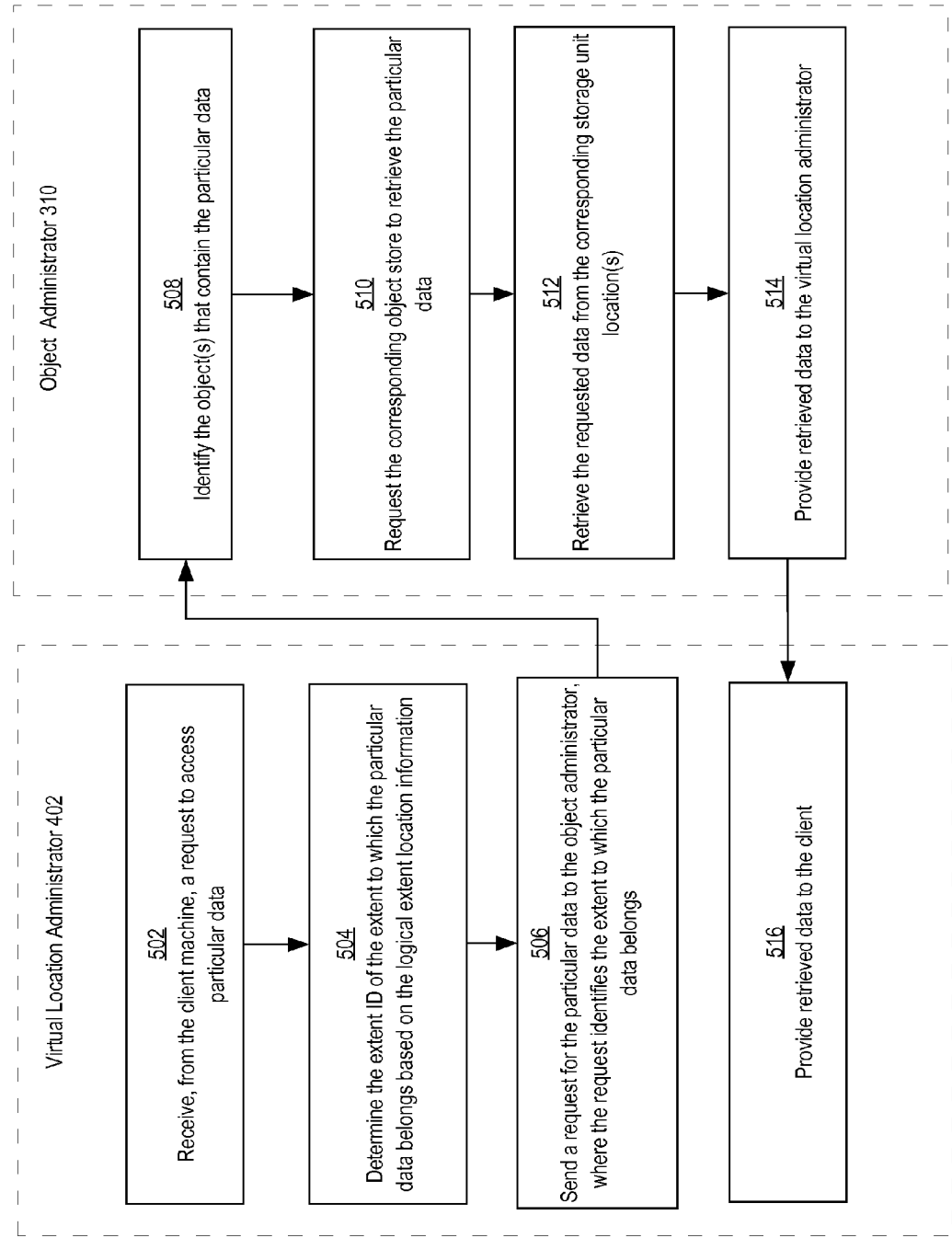
FIG. 5 illustrates an example process for utilizing extent-object mappings and object portion directories during the retrieval of client data.

2.1 Usage of Extent-Object Mappings and Object Portion Directories During Retrieval of Client Data FIG. 5 illustrates an example process for utilizing extent-object mappings and object portion directories during the retrieval of client data.

The process of FIG. 5 may be performed at storage unit administrator 106. At block 502, virtual location administrator 402 receives, from client machine 100, a request to access particular data. At block 504, virtual location administrator 402 determines the extent ID of the extent to which the particular data belongs using the logical extent location information 308. In other embodiments, virtual location administrator may determine the block or object to which the particular data belongs. Logical extent location information 308 may be a data extent mapping tree indexed by data offset and length. Virtual location administrator 402 may determine particular extent ID, offset, and length of the data using the data offset and length provided in the client request. The client request may identify the data offset as a file offset.

At block 506, virtual location administrator 402 sends a request for the particular data to object administrator 410. The request may identify the extent to which the data belongs, an offset amount indicating the distance from the beginning of the extent until the data begins, and a length amount indicating the amount of data contained in the extent starting from the offset. At block 508, object administrator 410 identifies the virtual storage object(s) that contain the requested data. Object administrator 410 may identify the object(s) that contain the requested data based on extent-object mappings 412. In other embodiments, extent-object mappings 412 may be stored at virtual location administrator 402 and virtual location administrator 402 may determine which object contains the requested data. Different object stores may be associated with different objects. Virtual location administrator 402 may select a corresponding object store from among a set of object stores by determining which object contains the requested data and selecting the object store corresponding to the selected object.

At block 510, object administrator 410 requests the corresponding object store to retrieve the particular data. The object store may determine the storage unit address(es) of the data based on the stored object portion directory and the received extent ID and, in some embodiments, length and offset information. In some embodiments, the object portion directory indicates, for each virtual storage object, the storage units whose portions make up the virtual storage object, the location within the storage unit of the storage unit portions that make up the virtual storage object, and the storage policy that corresponds to the virtual storage object. For example, the object portion directory may indicate that virtual storage object 310 comprises virtual object portions 316, 318, and 320 and that virtual object portion 316 begins at location X of storage unit 322, virtual object portion 318 begins at location Y of storage unit 324, virtual object portion 320 begins at location Z of storage unit 326. The object portion directory may also indicate that virtual storage object 310 is distributed according to a particular storage redundancy coding, such as RAID 5. Some embodiments may use alternative storage redundancy codings, such as erasure codings or the like, to achieve different objectives, as described in application Ser. No. 13/837,456. Each virtual object portion may be of a fixed size or the object portion directory may also indicate the amount of data stored at each virtual object portion.

At block 512, the corresponding object store retrieves the requested data from the corresponding storage unit location(s). At block 514, object administrator 410 provides the retrieved data to virtual location administrator 402. Along with the requested data, object administrator 410 may reiterate to virtual location administrator 402 the virtual location associated with the retrieved data.

To illustrate a clear example, virtual location administrator 402 is described above as using extent identifiers to identify the virtual locations of data, which are translated to object identifiers, and finally to storage unit portion addresses by object administrator 410. However, in other embodiments, data may be stored in other formats. For example, in other embodiments, virtual location administrator 402 may maintain references to logical block identifiers instead of logical extent identifiers, and the logical block identifiers may eventually be translated into storage unit portion addresses by object administrator 410.

Figure 6:
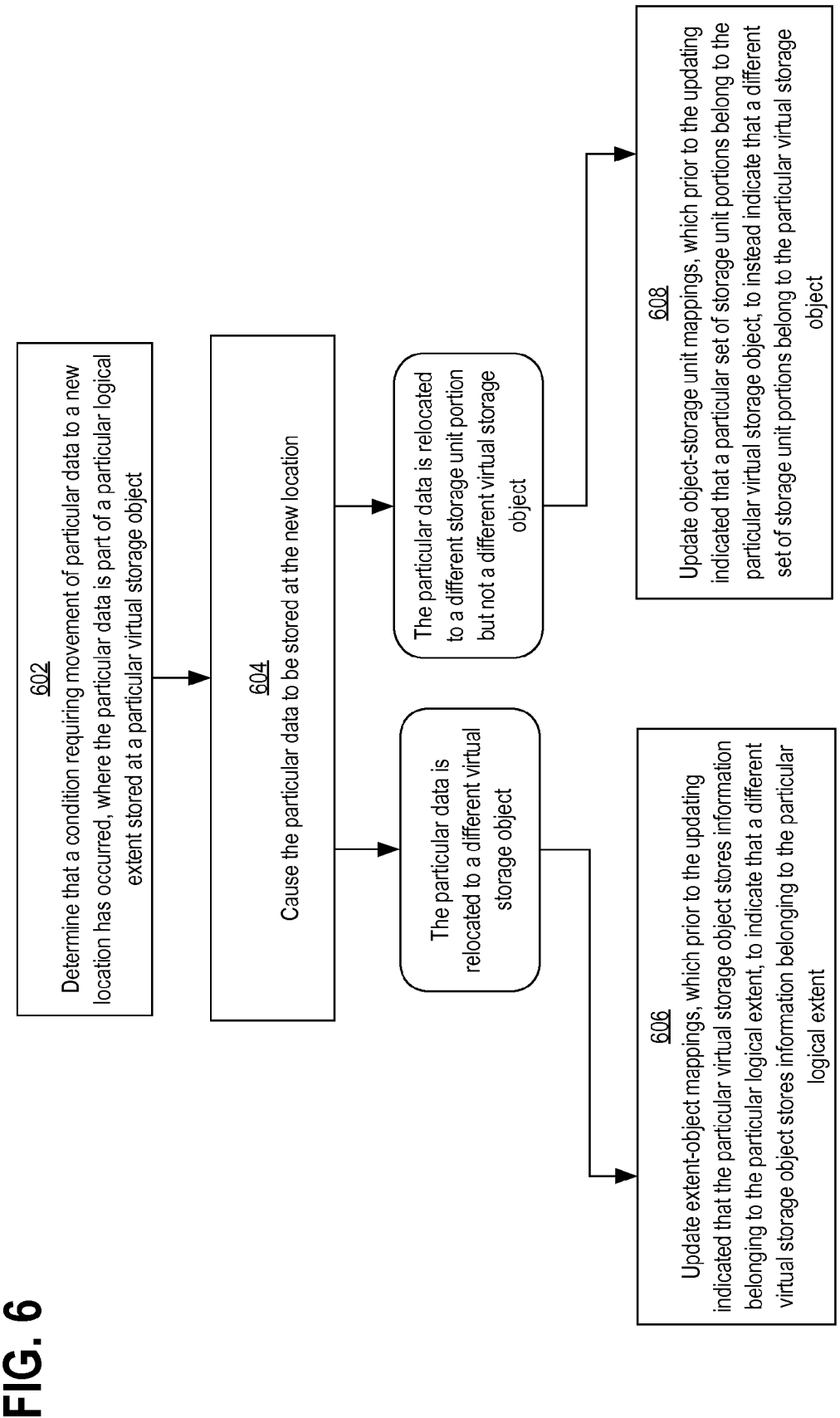
FIG. 6 illustrates an example process for updating location information upon relocating particular data.

2.2 Updating of Extent-Object Mappings or Object Portion Directories Upon Relocation of Client Data FIG. 6 illustrates an example process for updating location information upon relocating particular data. The process of FIG. 6 may be performed at storage unit administrator 106. At block 602, storage unit administrator 106 determines that a condition requiring movement of particular data to a new location has occurred, where the particular data is part of a particular logical extent stored at a particular virtual storage object.

At block 604, object administrator 410 causes the particular data to be stored at the new location. The relocation of the particular data may comprise storage unit administrator 106 relocating the data to an entirely different virtual storage object or to a different storage unit portion, which is added to the same particular virtual storage object which contained the relocated data prior to relocation. In response to the particular data being stored at the new location, storage unit administrator 106 performs either the step of block 606 or block 608, depending on whether the particular data is relocated to a different virtual storage object or only to a different storage unit portion.

At block 606, storage unit administrator 106 relocates the particular data to a different virtual storage object and storage unit administrator 106 updates extent-object mappings, which prior to the updating indicated that the particular virtual storage object stores information belonging to the particular logical extent, to indicate that a different virtual storage object stores information belonging to the particular logical extent.

At block 608, storage unit administrator 106 relocates the data to a different storage unit portion but not to a different virtual storage object. Storage unit administrator 106 updates object-storage unit mappings, which prior to the updating indicated that a particular set of storage unit portions belong to the particular virtual storage object, to instead indicate that a different set of storage unit portions belong to the particular virtual storage object.

In another embodiment, storage unit administrator 106 updates offset information in the object-storage unit mappings instead of changing the set of storage units that belong to an object. For example, object portion directory 416 may update object portion directory 416 to indicate that virtual storage object portion begins at location X+1024 of storage unit 322 instead of at location X of storage unit 322.

The data may be relocated to a storage unit portion that already belongs to the virtual storage object. For example, storage unit administrator 106 may consolidate the set of storage units that a virtual storage object spans. In such an embodiment, the object-storage unit portion mappings may be modified to indicate that the virtual storage object which contains the relocated data no longer includes the storage unit portion in which the data was previously located.

The data may also be relocated to a storage unit portion that does not belong to the virtual storage object. In such an embodiment, the object-storage unit portion mappings may be modified to indicate that the virtual storage object that contains the relocated data also includes the storage unit portion to which the data was relocated. If no data remains in the storage unit portion that previously contained the relocated data, the mappings may also be updated to indicate that the storage unit portion which previously contained the relocated data is removed from the virtual storage object As described in further detail in application Ser. No. 13/837,375, storage unit administrator 106 may cause use of a particular storage unit to be disabled in response to determining that the performance of the particular storage unit is inadequate. Storage unit administrator 106 may also disable the use of a first or second storage unit for at least a particular purpose in response to detecting a pattern of the two storage units performing similarly. The detection of such a pattern may indicate that two storage units are hosted by the same physical device. In response to determining to disable the use of a particular storage unit, storage unit administrator 106 may move all data stored at the particular storage unit to a different storage unit.

In some embodiments, each virtual storage object including a portion of the storage unit selected for disabling is modified to instead include a portion of a different storage unit. Modifying the virtual storage object to include the different storage unit portion may include updating the object portion directory of the corresponding object store to indicate that the virtual storage objects includes the new storage unit portions instead of the replaced storage unit portions. For example, an object portion directory entry indicating that that virtual storage object 100 includes locations X of storage unit 102 may be modified to indicate that virtual storage object 100 includes locations Y of storage unit 104.

As described in further detail in application Ser. No. 13/837,456, storage unit administrator 106 may cause data stored according to one storage policy to be stored according to a different storage policy. Changing the storage policy applicable to particular data may comprise changing the amount of storage unit portions used for purposes of data mirroring or redundancy, how many storage unit portions the data is striped across, the size of each storage unit portion, the particular erasure or redundancy coding used, or other parameters relating to the reliability, availability, performance and capacity of a storage unit.

In an embodiment, storage unit administrator 106 may determine, based on an analysis of a performance of a set of storage units, that a prior storage policy associated with a certain service level is no longer compatible with a performance expectation associated with the certain service level. Such a determination is an example condition whose occurrence requires movement of data from one physical location to another. In response to the determination, storage unit administrator 106 may change the storage policy associated with a particular service level. For example, the storage policy corresponding to a "gold" service level may require that a particular amount of data be striped over four storage unit portions of four different storage units. In response to determining that data is not being retrieved within an expected amount of time, storage unit administrator 106 may determine that the storage policy requires adjusting in order to meet a particular service level objective associated with the "gold" service level. Thus, storage unit administrator 106 may modify the storage policy corresponding to the "gold" service level to require that the data be striped over five storage unit portions of five different devices instead of four different devices.

As a result, virtual storage objects containing data stored according to the "gold" service level each may be modified to include a storage unit portion of a storage unit not already included in the virtual storage unit. Storage unit administrator 106 may move some data from the other storage unit portions belonging to the virtual storage object to the newly-added storage unit portions. According to various embodiments, changing the set of storage unit portions belonging to a particular virtual storage object may include adding, removing, or replacing storage unit portions.

Storage unit administrator 106 may also cause data stored according to one storage policy to be stored according to a different storage policy when storage unit administrator 106 associates particular data with a different service level. Storage unit administrator 106 may do so in response to receiving a request from client machine 100 to associate the particular data with a different service level. For example, the client may indicate a certain subset of data as being especially important. In response to receiving the indication from the client, storage unit administrator 106 may associate the data with a "platinum security" service level. The storage policy associated with the "platinum security" service level may require two storage unit portions to serve as two separate parity drives instead of other storage policies which may only include a single storage unit portion that serves as a single parity drive. In such an embodiment, storage unit administrator 106 may move the data to an entirely new virtual storage object instead of adding or removing the storage unit portions that belong to the virtual storage object in which the data is stored. As a result of moving the data to a new virtual storage object, storage unit administrator 106 may update extent-object mappings 412. For example, storage unit administrator 106 may modify a particular mapping indicating that data extent 102 is stored in virtual storage object 6 instead of virtual storage object 4.

In an embodiment, when the storage policy associated with a service level is modified, the set of storage unit portions belonging to a virtual storage object are changed and when the service level associated with particular data is changed, the data is moved to an entirely new virtual storage object.

Determining that a condition requiring movement of particular data to a new location has occurred may comprise determining that performance of a particular storage unit is inadequate, detecting the occurrence of a pattern indicating that two storage units are hosted by the same physical device, determining that a prior storage policy is no longer compatible with a performance expectation associated with a certain service level, or receiving a request from a client to associate the particular data with a different service level. Such conditions are only examples; storage unit administrator 106 may also perform the process of FIG. 6 in response to determining the occurrence of other conditions requiring movement of particular data to a new location, such as determining a need for general load balancing across different storage units.

The process of FIG. 6 may also be performed in cases where data or metadata needs to be rewritten, such as when data or metadata is transformed for encryption or compression purposes. For example, rewriting particular data may include rewriting the particular data to new storage unit portions and updating the object-storage unit mappings to indicate that the particular data is stored at the new storage unit portions instead of the previously specified storage unit portions, performing all data or metadata transformations within a single operation or composite transaction. Such an approach may be more efficient than a traditional approach where the particular data is first removed from a particular location before being rewritten in the same particular location, performed in a more costly manner as multiple individual operations per required transformation.

To illustrate a clear example, object administrator 410 is described above as updating mappings of objects to storage unit portions when data belonging to the object is moved from a first storage unit portion to another storage unit portion. In other embodiments, data may be stored in other formats. For example, in other embodiments, object administrator 410 may comprise mappings of logical blocks to storage unit portions and, in response to moving data from a first storage unit portion to a second storage unit portion, object administrator 410 may update a mapping of blocks to storage unit portions to indicate that a particular block includes the second storage unit portion instead of the first.

3.0 IMPLEMENTATION MECHANISMS—HARDWARE OVERVIEW

Figure 7:
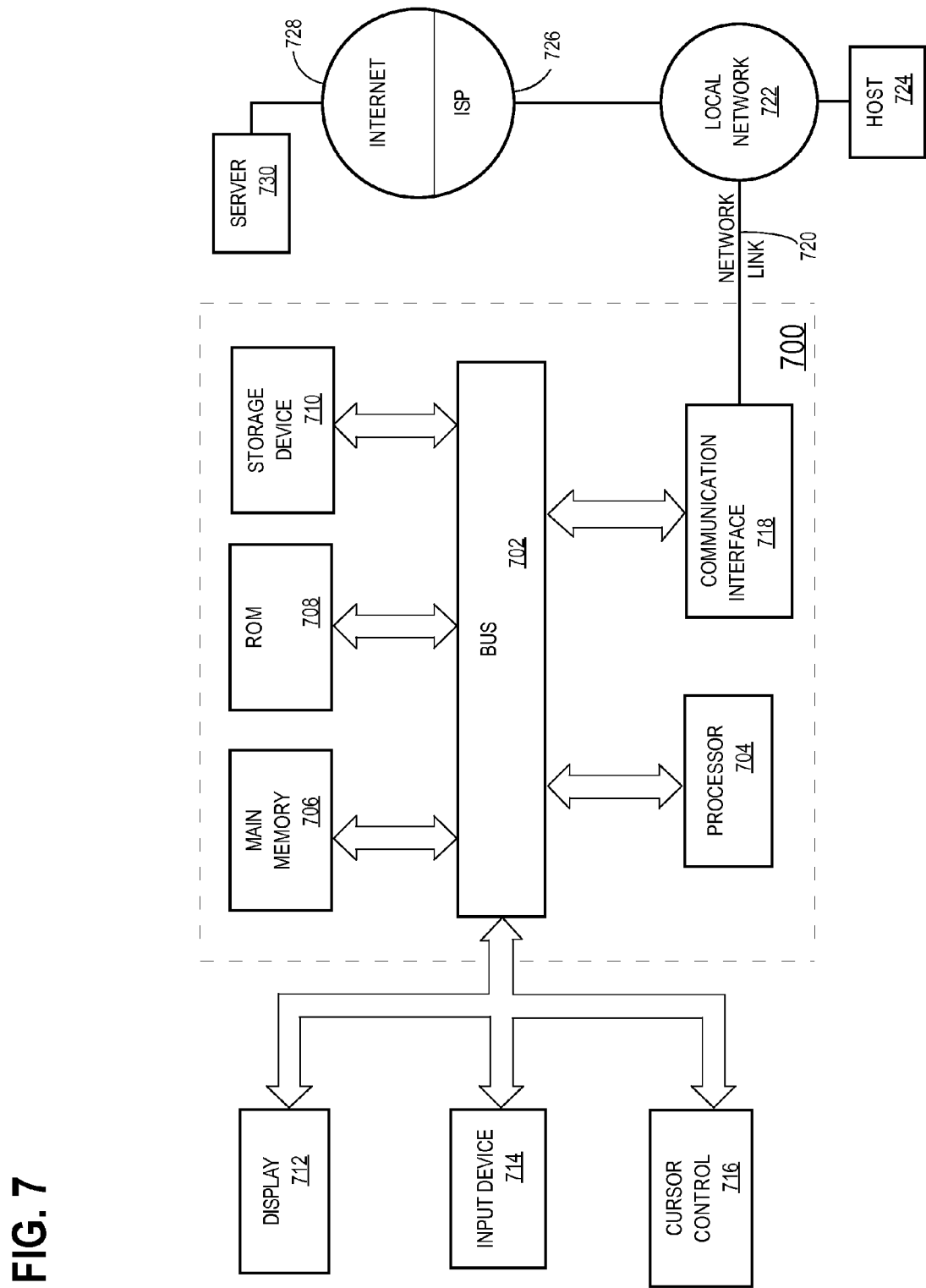
FIG. 7 illustrates a computer system upon which an embodiment may be implemented.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another machine-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 700, various machine-readable media are involved, for example, in providing instructions to processor 704 for execution. Such a medium may take many forms, including but not limited to storage media and transmission media. Storage media includes both non-volatile media and volatile media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 530 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer system 700 may obtain application code in the form of a carrier wave.

6.0 EXTENSIONS AND ALTERNATIVES

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   receiving, at a data storage system of a virtualized computer system, the data storage system managing access to data stored in a plurality of storage units hosted by two or more cloud service providers, a request for the data;
   determining that the request requires data associated with a particular logical extent, the particular logical extent including identifying information that associates the particular logical extent to a virtual location at which the data is stored;
   identifying, based on the virtual location at which the data is stored and two or more mappings of virtual locations to object administrators, an object administrator associated with physical storage of the data;
   wherein the virtual location, based on the two or more mappings, corresponds to a first object and a second object;
   removing a mapping from the two or more mappings identifying the second object as corresponding to the virtual location, without a corresponding update to identifying information associating the particular logical extent to the virtual location;
   determining, at the object administrator, based on the two or more mappings, a plurality of physical locations in the data storage system that correspond to the virtual location, the determining the plurality of physical locations comprising:
      determining, one or more objects that correspond to the virtual location in the request and are managed by the object administrator, wherein the one or more objects comprises at least the second object,
      determining, for each object of the one or more objects, a plurality of storage unit portions that belong to the object, and
      wherein each storage unit portion, of the plurality of storage unit portions, belongs to a different storage unit of the plurality of storage units;
   retrieving the data from the plurality of physical locations of the data storage system of the virtualized computer system, wherein each of the plurality of physical locations indicates a storage unit portion in the plurality of storage unit portions;

wherein the method is performed using one or more computing devices.

2. The method of claim 1 wherein the request for data identifies at least a logical extent at which the data is stored.

3. The method of claim 1, wherein the virtual location is identified by a logical object identifier.

4. The method of claim 1, wherein the virtual location is identified by a logical block number in a virtual disk, file, or object.

5. The method of claim 1, wherein the virtual location is identified by a byte-offset in a virtual disk, file, or object.

6. A method comprising:
determining, at a storage administrator, that a condition has occurred requiring transformation of particular data or movement of particular data to one or more new physical locations in a data storage system of a virtualized computer system, the data storage system managing access to the particular data stored in a plurality of storage units, hosted by two or more cloud service providers, at a particular virtual location;
wherein the particular virtual location, based on one or more object-storage unit mappings, corresponds to prior physical locations comprising a first physical storage location and a second physical storage location, and that the one or more new physical locations comprises the first physical storage location and not the second physical storage location;
determining that the particular data, based on two or more extent-object mappings, is associated with a particular logical extent including identifying information that associates the particular logical extent to the particular virtual location;
in response to the determination that the condition has occurred:
storing data corresponding to the particular data at the one or more new physical locations;
removing a mapping corresponding to the particular virtual location to indicate that the particular virtual location corresponds to the first physical location instead of the first and second physical locations without updating any extent-object mapping associating the particular logical extent to the particular virtual location;
wherein the particular data is stored at the particular logical extent corresponding to the particular virtual location;
updating one or more of:
the extent-object mappings, which prior to the updating indicated that a particular virtual storage object, comprising a particular set of storage unit portions, stores information belonging to the particular logical extent, to indicate that a different virtual storage object, comprising a different set of storage unit portions corresponding to the one or more new physical locations, stores information belonging to the particular logical extent, or
the object-storage unit mappings, which prior to the updating indicated that the particular set of storage unit portions belong to the particular virtual storage object, to instead indicate that the different set of storage unit portions, corresponding to the one or more new physical locations, belong to the particular virtual storage object, without a corresponding update to the extent-object mappings;
wherein each storage unit portion, of the different set of storage unit portions, belongs to a different storage unit of the plurality of storage units;

wherein the method is performed using one or more computing devices.

7. The method of claim 6, comprising:
monitoring performance of a plurality of different storage units in a virtual data center;
determining that the condition has occurred based on the monitoring.

8. The method of claim 6, wherein the particular data is stored at a first storage device and wherein storing the data at the one or more new physical locations comprises moving the particular data to a second storage device different from the first storage device.

9. The method of claim 6, wherein determining that the condition has occurred comprises receiving a request for a different service level from a client computer.

10. The method of claim 6, wherein determining that the condition has occurred comprises determining that at least a particular storage unit is not performing adequately, and wherein the particular storage unit is included in the particular set of storage unit portions and not included in the different set of storage unit portions.

11. The method of claim 6, comprising:
wherein determining that the condition has occurred comprises determining that a service level corresponding to the particular data has changed;
updating the extent-object mappings, which prior to the updating indicated that the particular virtual storage object stores information belonging to the particular logical extent, to instead indicate that the different virtual storage object stores information belonging to the particular logical extent.

12. The method of claim 6, wherein at least two storage unit portions of the different set of storage unit portions are portions of two different storage unit devices.

13. The method of claim 6, wherein the particular set of storage unit portions includes a particular storage unit portion not included in the different set of storage unit portions.

14. The method of claim 6, wherein the different set of storage unit portions include each storage unit portion in the particular set of storage unit portions in addition to one or more additional storage unit portions.

15. The method of claim 6, comprising:
concurrently applying two different types of transformations to one or more data portions.

16. The method of claim 6, comprising:
wherein the particular data comprises a first data portion stored at a first object belonging to a logical extent and a second data portion stored at a second object belonging to the same logical extent;
in a single input or output operation, concurrently transforming both the first data portion and the second data portion, wherein concurrently transforming both the first data portion and the second data portion comprises:
applying a first type of transformation to the first data portion;
storing a transformed version of the first data portion at a first new object different than the first object;
applying a second type of transformation different than the first type of transformation to the second data portion;
storing a transformed version of the second data portion at a second new object different than the second object;

updating a mapping corresponding to the logical extent to indicate that the first new object and second new object belong to the logical extent.

17. The method of claim 6, comprising:
wherein the particular data comprises a first data portion stored at a first storage unit portion belonging to a virtual storage object and a second data portion stored at a second storage unit portion belonging to the same virtual storage object;
in a single input/output operation, concurrently transforming both the first data portion and the second data portion, wherein concurrently transforming both the first data portion and the second data portion comprises:
applying a first type of transformation to the first data portion;
storing a transformed version of the first data portion at a first new storage unit portion different than the first storage unit portion;
applying a second type of transformation different than the first type of transformation to the second data portion;
storing a transformed version of the second data portion at a second new storage unit portion different than the second storage unit portion;
updating a mapping corresponding to the virtual storage object to indicate that the first new storage unit portion and second new storage unit portion belong to the virtual storage object.

18. A non-transitory computer-readable storage medium comprising one or more sequences of instructions which when executed by one or more processors cause the one or more processors to perform:
receiving, at a data storage system of a virtualized computer system, the data storage system managing access to data stored in a plurality of storage units hosted by two or more cloud service providers, a request for the data;
determining that the request requires data associated with a particular logical extent, the particular logical extent including identifying information that associates the particular logical extent to a virtual location at which the data is stored;
identifying, based on the virtual location at which the data is stored and two or more mappings of virtual locations to object administrators, an object administrator associated with physical storage of the data;
wherein the virtual location, based on the two or more mappings, corresponds to a first object and a second object;
removing a mapping from the two or more mappings identifying the second object as corresponding to the virtual location, without a corresponding update to identifying information associating the particular logical extent to the virtual location;
determining, at the object administrator, based on the two or more mappings, a plurality of physical locations in the data storage system that correspond to the virtual location, the determining the plurality of physical locations comprising:
determining, one or more objects that correspond to the virtual location in the request and are managed by the object administrator, wherein the one or more objects comprises at least the second object,
determining, for each object of the one or more objects, a plurality of storage unit portions that belong to the object, and
wherein each storage unit portion, of the plurality of storage unit portions, belongs to a different storage unit of the plurality of storage units;
retrieving the data from the plurality of physical locations of the data storage system of the virtualized computer system, wherein each of the plurality of physical locations indicates a storage unit portion in the plurality of storage unit portions.

19. The non-transitory computer-readable storage medium of claim 18, wherein the request for data identifies at least a logical extent at which the data is stored.

20. The non-transitory computer-readable storage medium of claim 18, wherein the virtual location is identified by a logical object identifier.

21. The non-transitory computer-readable storage medium of claim 18, wherein the virtual location is identified by a logical block number in a virtual disk, file, or object.

22. The non-transitory computer-readable storage medium of claim 18, wherein the virtual location is identified by a byte-offset in a virtual disk, file, or object.

23. A non-transitory computer-readable storage medium comprising one or more sequences of instructions which when executed by one or more processors cause the one or more processors to perform:
determining, at a storage administrator, that a condition has occurred requiring transformation of particular data or movement of particular data to one or more new physical locations in a data storage system of a virtualized computer system, the data storage system managing access to the particular data stored in a plurality of storage units, hosted by two or more cloud service providers, at a particular virtual location;
wherein the particular virtual location, based on two or more object-storage unit mappings, corresponds to prior physical locations comprising a first physical storage location and a second physical storage location, and that the one or more new physical locations comprises the first physical storage location and not the second physical storage location;
determining that the particular data, based on two or more extent-object mappings, is associated with a particular logical extent including identifying information that associates the particular logical extent to the particular virtual location;
in response to the determination that the condition has occurred:
storing data corresponding to the particular data at the one or more new physical locations;
removing a mapping corresponding to the particular virtual location to indicate that the particular virtual location corresponds to the first physical location instead of the first and second physical locations without updating any extent-object mapping associating the particular logical extent to the particular virtual location;
wherein the particular data is stored at the particular logical extent corresponding to the particular virtual location;
updating one or more of:
the extent-object mappings, which prior to the updating indicated that a particular virtual storage object, comprising a particular set of storage unit portions, stores information belonging to the particular logical extent, to indicate that a different virtual storage object, comprising a different set of storage unit portions corresponding to the one or more new physical locations, stores information belonging to the particular logical extent, or the object-storage unit mappings, which prior to the updating indicated that the particular set of storage unit portions belong to the particular virtual storage object, to instead indicate that the different set of storage unit portions, corresponding to the one or more new physical locations, belong to the particular virtual storage object, without a corresponding update to the extent-object mappings;

wherein each storage unit portion, of the different set of storage unit portions, belongs to a different storage unit of the plurality of storage units.

24. The non-transitory computer-readable storage medium of claim 23, wherein the sequences of instructions which when executed by the one or more processors cause the one or more processors to further perform:

monitoring performance of a plurality of different storage units in a virtual data center;

determining that the condition has occurred based on the monitoring.

25. The non-transitory computer-readable storage medium of claim 23, wherein the particular data is stored at a first storage device and wherein storing the data at the one or more new physical locations comprises moving the particular data to a second storage device different from the first storage device.

26. The non-transitory computer-readable storage medium of claim 23, wherein determining that the condition has occurred comprises receiving a request for a different service level from a client computer.

27. The non-transitory computer-readable storage medium of claim 23, wherein determining that the condition has occurred comprises determining that at least a particular storage unit is not performing adequately, and wherein the particular storage unit is included in the particular set of storage unit portions and not included in the different set of storage unit portions.

28. The non-transitory computer-readable storage medium of claim 23, wherein the sequences of instructions which when executed by the one or more processors cause the one or more processors to further perform:

wherein determining that the condition has occurred comprises determining that a service level corresponding to the particular data has changed;

updating the extent-object mappings, which prior to the updating indicated that the particular virtual storage object stores information belonging to the particular logical extent, to instead indicate that the different virtual storage object stores information belonging to the particular logical extent.

29. The non-transitory computer-readable storage medium of claim 23, at least two storage unit portions of the different set of storage unit portions are portions of two different storage unit devices.

30. The non-transitory computer-readable storage medium of claim 23, the particular set of storage unit portions includes a particular storage unit portion not included in the different set of storage unit portions.

31. The non-transitory computer-readable storage medium of claim 23, the different set of storage unit portions include each storage unit portion in the particular set of storage unit portions in addition to one or more additional storage unit portions.

32. The non-transitory computer-readable storage medium of claim 23, wherein the sequences of instructions which when executed by the one or more processors cause the one or more processors to further perform:

concurrently applying two different types of transformations to one or more data portions.

33. The non-transitory computer-readable storage medium of claim 23, wherein the sequences of instructions which when executed by the one or more processors cause the one or more processors to further perform:

wherein the particular data comprises a first data portion stored at a first object belonging to a logical extent and a second data portion stored at a second object belonging to the same logical extent;

in a single input or output operation, concurrently transforming both the first data portion and the second data portion, wherein concurrently transforming both the first data portion and the second data portion comprises:

applying a first type of transformation to the first data portion;

storing a transformed version of the first data portion at a first new object different than the first object;

applying a second type of transformation different than the first type of transformation to the second data portion;

storing a transformed version of the second data portion at a second new object different than the second object;

updating a mapping corresponding to the logical extent to indicate that the first new object and second new object belong to the logical extent.

34. The non-transitory computer-readable storage medium of claim 23, wherein the sequences of instructions which when executed by the one or more processors cause the one or more processors to further perform:

wherein the particular data comprises a first data portion stored at a first storage unit portion belonging to a virtual storage object and a second data portion stored at a second storage unit portion belonging to the same virtual storage object;

in a single input/output operation, concurrently transforming both the first data portion and the second data portion, wherein concurrently transforming both the first data portion and the second data portion comprises:

applying a first type of transformation to the first data portion;

storing a transformed version of the first data portion at a first new storage unit portion different than the first storage unit portion;

applying a second type of transformation different than the first type of transformation to the second data portion;

storing a transformed version of the second data portion at a second new storage unit portion different than the second storage unit portion;

updating a mapping corresponding to the virtual storage object to indicate that the first new storage unit portion and second new storage unit portion belong to the virtual storage object.

35. A storage administrator apparatus comprising:

one or more processors;

an instantiator coupled to the one or more processors and configured to instantiate one or more new storage units of a storage system of a virtualized computer system, the storage system managing access to particular data stored in a plurality of storage units hosted by two or more cloud service providers;

location information indicating, for each virtual location of a plurality of virtual locations, one or more physical locations corresponding to the virtual location, the plurality of virtual locations including a particular virtual location at which the particular data is stored;

computer memory coupled to the one or more processors and storing one or more sequences of instructions which when executed by the one or more processors cause:

determining that a condition requiring transformation of the particular data or movement of particular data to one or more new physical locations has occurred;

determining that the particular data, based on two or more extent-object mappings, is associated with a particular logical extent including identifying information that associates the particular logical extent to the particular virtual location;

wherein the particular virtual location, based on two or more object-storage unit mappings, corresponds to prior physical locations comprising a first physical storage location and a second physical storage location, and the one or more new physical locations comprises the first physical storage location and not the second physical storage location;

in response to the determination that the condition has occurred:

storing data corresponding to the particular data at the one or more new physical locations;

removing a mapping corresponding to the particular virtual location to indicate that the particular virtual location corresponds to the first physical location instead of the first and second physical locations without updating any extent-object mapping associating the particular logical extent to the particular virtual location;

wherein the particular data is stored at the particular logical extent corresponding to the particular virtual location;

updating one or more of:

the extent-object mappings, which prior to the updating indicated that a particular virtual storage object, comprising a particular set of storage unit portions, stores information belonging to the particular logical extent, to indicate that a different virtual storage object, comprising a different set of storage unit portions corresponding to the one or more new physical locations, stores information belonging to the particular logical extent, or the object-storage unit mappings, which prior to the updating indicated that the particular set of storage unit portions belong to the particular virtual storage object, to instead indicate that the different set of storage unit portions, corresponding to the one or more new physical locations, belong to the particular virtual storage object, without a corresponding update to the extent-object mappings; and wherein each storage unit portion, of the different set of storage unit portions, belongs to a different storage unit of the plurality of storage units.

36. The storage administrator apparatus of claim 35, wherein the sequences of instructions which when executed further cause:

monitoring performance of a plurality of different storage units in a virtual data center;

determining that the condition has occurred based on the monitoring.

37. The storage administrator apparatus of claim 35, wherein the particular data is stored at a first storage device and wherein storing the data at the one or more new physical locations comprises moving the particular data to a second storage device different from the first storage device.

38. The storage administrator apparatus of claim 35, wherein determining that the condition has occurred comprises receiving a request for a different service level from a client computer.

39. The storage administrator apparatus of claim 35, wherein determining that the condition has occurred comprises determining that at least a particular storage unit is not performing adequately, and wherein the particular storage unit is included in the particular set of storage unit portions and not included in the different set of storage unit portions.

40. The storage administrator apparatus of claim 35, wherein the sequences of instructions which when executed further cause:

wherein determining that the condition has occurred comprises determining that a service level corresponding to the particular data has changed;

updating the extent-object mappings, which prior to the updating indicated that the particular virtual storage object stores information belonging to the particular logical extent, to instead indicate that the different virtual storage object stores information belonging to the particular logical extent.

41. The storage administrator apparatus of claim 35, wherein at least two storage unit portions of the different set of storage unit portions are portions of two different storage unit devices.

42. The storage administrator apparatus of claim 35, wherein the particular set of storage unit portions includes a particular storage unit portion not included in the different set of storage unit portions.

43. The storage administrator apparatus of claim 35, wherein the different set of storage unit portions include each storage unit portion in the particular set of storage unit portions in addition to one or more additional storage unit portions.

44. The storage administrator apparatus of claim 35, concurrently applying two different types of transformations to one or more data portions.

45. The storage administrator apparatus of claim 35, wherein the particular data comprises a first data portion stored at a first object belonging to a logical extent and a second data portion stored at a second object belonging to the same logical extent;

wherein the sequences of instructions which when executed further cause:

in a single input/output operation, concurrently transforming both the first data portion and the second data portion, wherein concurrently transforming both the first data portion and the second data portion comprises:

applying a first type of transformation to the first data portion;

storing a transformed version of the first data portion at a first new object different than the first object;

applying a second type of transformation different than the first type of transformation to the second data portion;

storing a transformed version of the second data portion at a second new object different than the second object;

updating a mapping corresponding to the logical extent to indicate that the first new object and second new object belong to the logical extent.

46. The storage administrator apparatus of claim 35, wherein the particular data comprises a first data portion stored at a first storage unit portion belonging to a virtual storage object and a second data portion stored at a second storage unit portion belonging to the same virtual storage object;

wherein the sequences of instructions which when executed further cause:

in a single input/output operation, concurrently transforming both the first data portion and the second data portion, wherein concurrently transforming both the first data portion and the second data portion comprises:

applying a first type of transformation to the first data portion;

storing a transformed version of the first data portion at a first new storage unit portion different than the first storage unit portion;

applying a second type of transformation different than the first type of transformation to the second data portion;

storing a transformed version of the second data portion at a second new storage unit portion different than the second storage unit portion;

updating a mapping corresponding to the virtual storage object to indicate that the first new storage unit portion and second new storage unit portion belong to the virtual storage object.

* * * * *